United States Patent [19]

Hoshi

[11] Patent Number: 5,799,130

[45] Date of Patent: *Aug. 25, 1998

[54] VIDEO SIGNAL RECORDING APPARATUS

[75] Inventor: Hidenori Hoshi, Kanagawa-ken, Japan

[73] Assignee: Canon Kabushiki Kaisha, Tokyo, Japan

[*] Notice: The term of this patent shall not extend beyond the expiration date of Pat. No. 5,629,811.

[21] Appl. No.: 766,517

[22] Filed: Dec. 13, 1996

Related U.S. Application Data

[63] Continuation of Ser. No. 208,483, Mar. 9, 1994, Pat. No. 5,629,811, which is a continuation of Ser. No. 90,247, Jul. 9, 1993, abandoned, which is a continuation of Ser. No. 956,599, Oct. 5, 1992, abandoned, which is a continuation of Ser. No. 427,327, Oct. 25, 1989, abandoned.

[30] Foreign Application Priority Data

Oct. 31, 1988 [JP] Japan .................. 63-275254

[51] Int. Cl.⁶ .................. H04N 5/926; H04N 5/917
[52] U.S. Cl. .................. 386/124; 386/112
[58] Field of Search .................. 386/46, 109, 111, 386/112, 27, 33, 34, 124; 360/32; 348/384, 22, 47, 48; H04N 5/926, 5/917

[56] References Cited

U.S. PATENT DOCUMENTS

| | | | |
|---|---|---|---|
| 4,931,879 | 6/1990 | Koga et al. | 386/111 |
| 5,629,811 | 5/1997 | Hoshi | 360/22 |

*Primary Examiner*—Robert Chevalier
*Attorney, Agent, or Firm*—Robin, Blecker & Daley

[57] ABSTRACT

An apparatus for digitizing video signals and recording the digitized video signals on a recording medium. Digital video signals corresponding to one picture are subjected to a first arrangement transformation in which the arrangement of signals is transformed in each picture, and then to a second arrangement transformation in which the arrangement of signals is transformed in a plurality of pictures. The digital video signals after the first and second transformations are recorded by successively forming a plurality of parallel tracks.

9 Claims, 3 Drawing Sheets

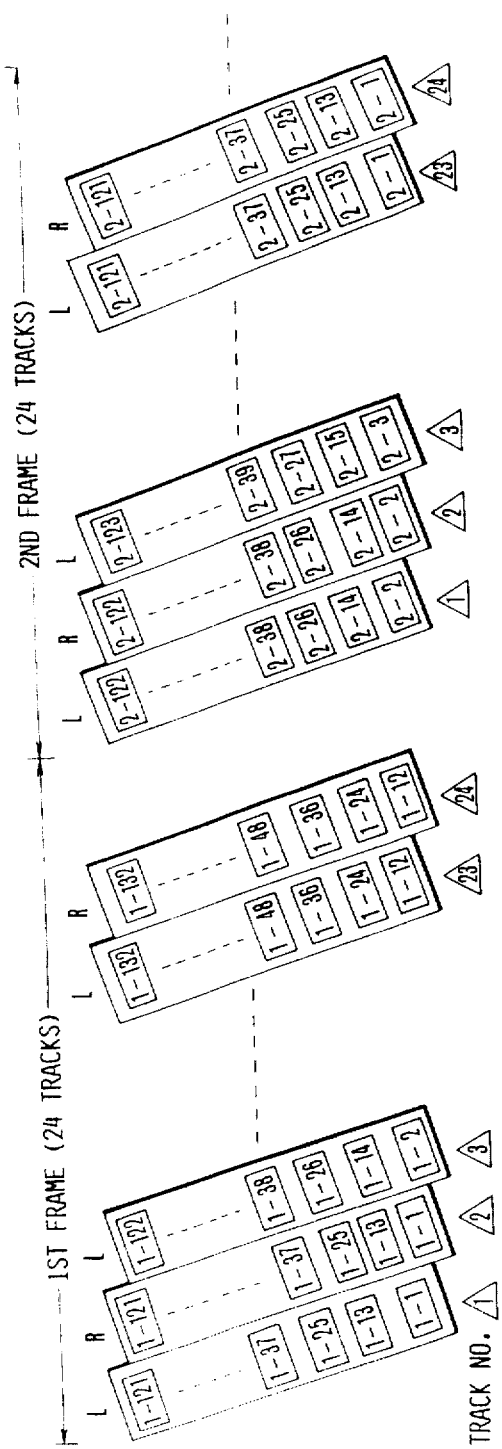
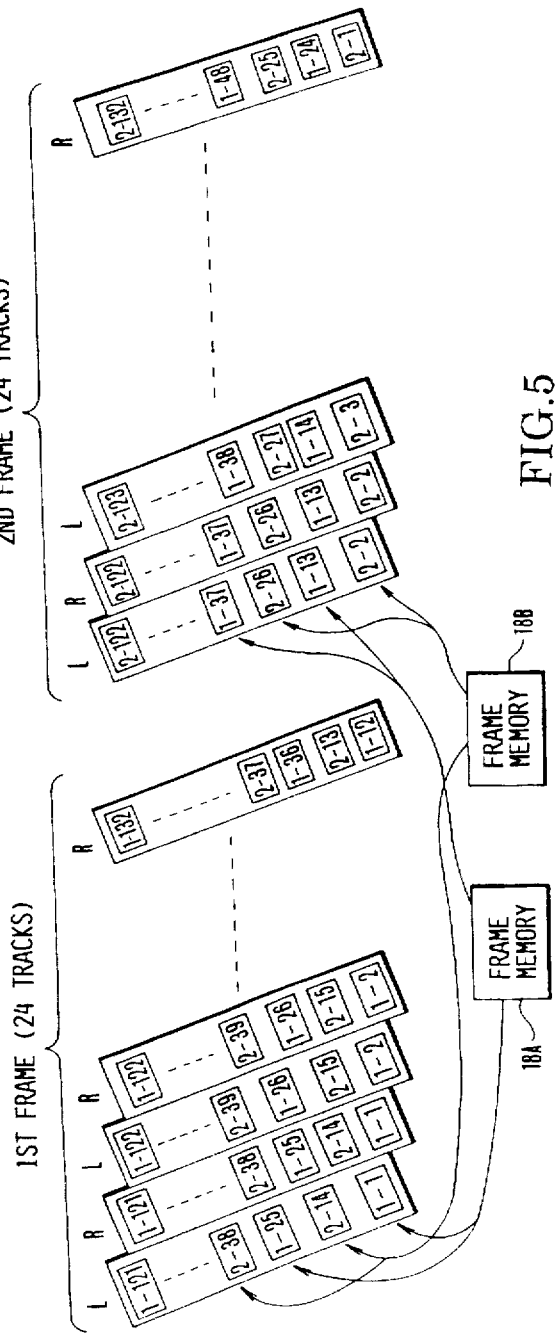
FIG.4
FIG.5

VIDEO SIGNAL RECORDING APPARATUS

This application is a continuation of application Ser. No. 08/208,483, filed Mar. 9, 1994, now Patent U.S. Pat. No. 5,629,811 which is a continuation of Ser. No. 08/090,247, filed Jul. 9, 1993, abandoned, which is a continuation of Ser. No. 07/956,599, filed Oct. 5, 1992, abandoned, which is a continuation of Ser. No. 07/427,327 filed Oct. 25, 1989, abandoned.

BACKGROUND OF THE INVENTION

1. Field of the Invention

The present invention relates to a video signal recording apparatus and, more particularly, to a video signal recording apparatus for digitizing video signals and recording the digitized video signals on a recording medium.

2. Description of the Related Art

A conventional apparatus for digitally recording video signals on a recording medium is designed to conduct a process such as transformation of data arrangement (referred to as "interleave" hereinafter) before the digitized signals are recorded on a recording medium, in order to correct any error. Known interleave techniques, however, are unsatisfactory in that no specific consideration is given to prevention of deterioration of the reproduced image quality which is experienced particularly in a case where the probability of reproduction of correct data is extremely small as in the case of a special reproduction mode, e.g., when a recording medium such as a tape is transported at a speed which is different from the tape speed in the recording. More specifically, a conventional interleave process is executed in each frame, and the interleave rule is fixed and unchangeable for all frames.

When video signals recorded on a video tape is reproduced in a special reproduction mode by a conventional video signal recording apparatus, there are some portions of the tape which are omitted from the scanning coverage of the reproduction head. In addition, reproduction is often impossible even from the scanned portion of the tape, due to a difference between the azimuth of the head and the azimuth of the track. If the same interleave rule is applied to all frames, only the same line blocks are reproduced in each reproduced frame. This problem is serious particularly in the so-called high-speed searching mode. In this mode, partly because the tape running speed is an integer number times the recording tape speed and partly because the number of the reproduced data is reduced, only the specific portions in a restricted region on the picture are repeatedly reproduced, with the result that the quality of the picture is extremely degraded.

In order to obviate this problem, U.S. Pat. application Ser. No. 317,430 filed on Mar. 1, 1989 proposes a method in which different interleave rules are applied to different frames. This proposal makes it possible to improve the quality of reproduced image in the special reproduction mode, without causing any substantial change in hardware.

SUMMARY OF THE INVENTION

The present invention aims at an improvement in the art proposed in the above-mentioned patent application.

An object of the present invention is to provide a video signal recording apparatus which is capable of recording digital video signals in such a manner that a good reproduction image, continuous in terms of time, can be obtained even in a special reproduction mode.

To this end, according to one aspect of the present invention, there is provided a video signal recording apparatus comprising: input means for inputting digitized video signals; first arrangement transforming means for transforming the arrangement of the input digital video signals in each picture; second arrangement transforming means for transforming, in a plurality of pictures, the arrangement of the digital video signals transformed by the first arrangement transforming means; and recording means for recording, on a recording medium, the digital video signals the arrangement of which has been transformed by the second arrangement transforming means.

The above and other objects, features and advantages of the present invention will become clear from the following description of the preferred embodiments when the same is read in conjunction with the accompanying drawings.

BRIEF DESCRIPTION OF THE DRAWINGS

FIG. 4 is an illustration of a data arrangement after completion of a first interleave process performed by the apparatus shown in FIG. 1; and FIG. 5 is an illustration of a data arrangement after completion of a second interleave operation performed by the apparatus shown in FIG. 1.

DETAILED DESCRIPTION OF THE PREFERRED EMBODIMENT

A preferred embodiment of the present invention will be described with reference to the accompanying drawings.

Figure 1:
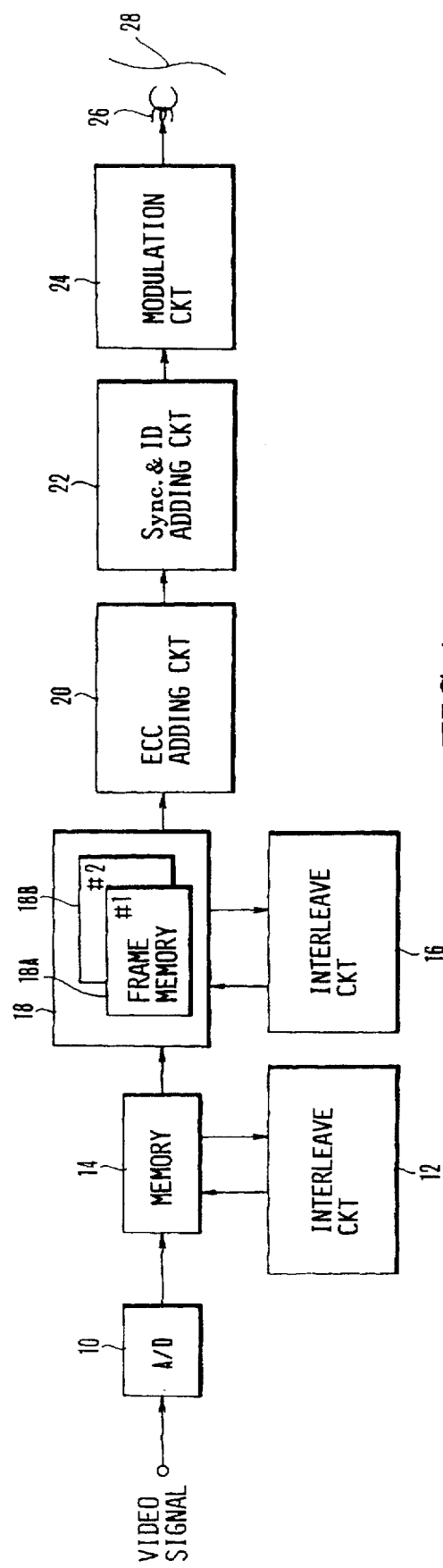
FIG. 1 is a block diagram showing the major components of an embodiment of the video signal recording apparatus in accordance with the present invention.

FIG. 1 is a block diagram schematically showing the construction of an embodiment of the video signal recording apparatus of the present invention. The video signal recording apparatus has the following components or sections; an A/D converter 10 for converting analog video signals into digital video signals; an interleave circuit 12 for conducting interleave process in a frame; a memory 14 which is capable of storing digital video signals at least in an amount corresponding to one picture and which is capable of being accessed by the interleave circuit 12; an interleave circuit 16 which conducts an interleave process in a plurality of frames, i.e., in the direction of the time axis; a memory 18 which has a frame memory 18A and another frame memory 18B and which can be accessed by the interleave circuit 16; an ECC adding circuit 20 for adding an error check code (ECC); a circuit 22 for adding a synchronization code (Sync) and additional information (ID); a modulation circuit 24; a magnetic head 26; and a video tape 28.

Although separate memories 14 and 18 are shown for an easier understanding of the invention, it will be clear to those skilled in the art that these memories may be integrated in a common memory circuit.

Figure 2:
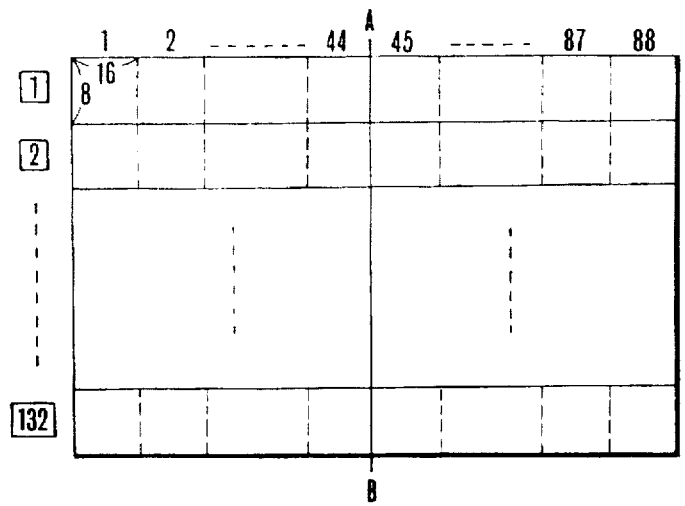
FIG. 2 is an illustration of a method of division of each picture into blocks performed in the apparatus shown in FIG. 1.

The interleave process performed by the interleave circuit 12 will be described with reference to FIG. 2. Referring to FIG. 2, there is shown a matrix of a picture explanatory of a method of dividing the picture of an original image into a plurality of blocks. In this embodiment, interleave process is conducted by dividing the picture into two parts by a central vertical line A-B. A block, as the smallest or minimum unit reproducible in the special reproduction mode, is determined to include 8 picture elements in the row direction and 16 picture elements in the column direction. From the relationship between the number of effective picture elements in the picture and the size of the block, the picture is divided into 88 blocks in the horizontal direction and 132 blocks in the vertical direction. Thus, the picture contains 132 horizontal rows of blocks, each row including 88 blocks. Each of the 132 horizontal rows of blocks will be referred to as a line block.

Figure 3:
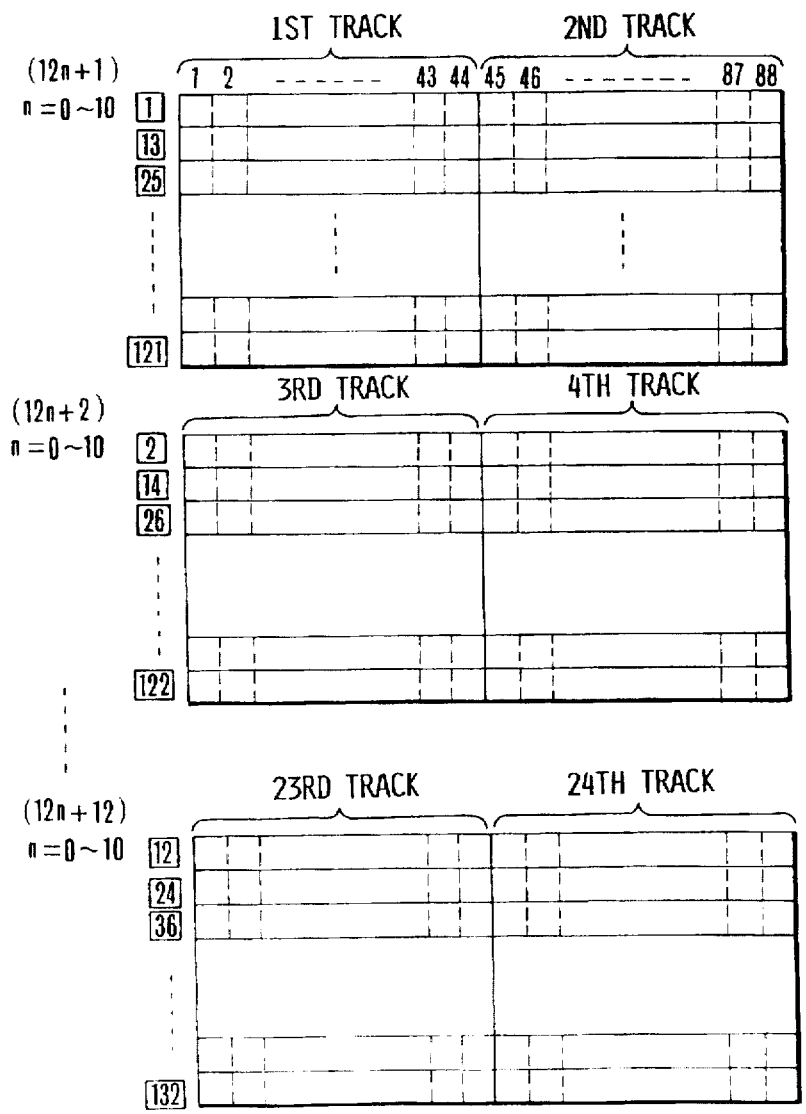
FIG. 3 is an illustration of a method of distribution of blocks of each picture to a plurality of tracks performed in the apparatus shown in FIG. 1.

The image information of the picture is interleaved in a manner shown in FIG. 3. Namely, (12n+1)-th line blocks (n being an integer of 0 to 10) are extracted and a data matrix composed of a batch of the extracted data is divided into a left data group which is to be recorded on a first track and a right data group which is to be recorded on a second track. Similarly, (12n+2)-th line block, (12n+3)-th line blocks, ... (12n+12)-th line blocks are successively extracted and left and right data groups which are to be recorded on different tracks are formed from each data matrix. In consequence, 24 tracks are obtained from one frame (picture). It will be seen that data groups corresponding to the left section of the picture, i.e., in the section which is on the left side of the line A–B in FIG. 2, are recorded on the odd-number-th tracks, while the data groups corresponding to the right section of the picture are recorded on the even-number-th tracks. This interleave rule, however, is not applied to all frames. Namely, the interleave circuit 12 also serves to apply different interleave rules to different frames.

FIG. 4, shows the manner in which different interleave rules are applied to different frames. In this figure, "1–121" appearing in a small rectangular framework shows the 121th line block in a first frame. Thus, "n" represents a number of the frame, while "m" identifies a number of the line block among 132 line blocks in this frame. In the first frame, the interleave process is conducted such that data from every 12 line blocks starting with the first line block are recorded in the first and second tracks. However, in the second frame, the interleave process is conducted such that the first and the second tracks record data derived from every 12 line blocks starting with the second line block. In conarrangement, the 23rd and 24th tracks in the second frame record the data corresponding to the data recorded in the first and second tracks in the first frame. The interleave circuit 12 conducts the same change of the interleave rule on the third and following frames, so that the track to which the date from the first line block is distributed is changed for successive frames. In conarrangement, the relationship between the array of the data and the array of picture elements on the picture is changed for successive frames, after the interleave process performed by the interleave circuit 12. The manner or pattern of change in the interleave rule shown in FIG. 4 is only illustrative, and various other manners or patterns may be adopted.

A description will be given of the process executed by the interleave circuit 16. After the interleave process performed by the interleave circuit 12, the data of the first frame is stored in the frame memory 18A, while the data of the second frame is stored in the frame memory 18B. The interleave circuit 16 reads information alternately from the frame memories 18A and 18B such that the information is recorded on the video tape 28 in an arrangement as shown in FIG. 5, and delivers the read information to the ECC adding circuit 20. Thus, the portion of the video tape 28 corresponding to the first frame contains data composed of 50% of the video data from the first frame of the video signal to be recorded and 50% of the video data from the second frame. Conversely, the portion of the video tape 28 corresponding to the second frame contains the remaining 50% of the video data from the first frame of the video data to be recorded and the remaining 50% of the video data from the second frame. After the recording of the video data of these two frames, the frame memory 18A stores the information of the third frame, while the frame memory 18B stores the information of the fourth frame, and the information of the third frame and the information of the fourth frame are processed in the same manner as that conducted on the first and second frames, so as to be recorded in the video tape 28. This operation is successively conducted, with the data from the odd-number-th frames and the data from even-number-th frames stored in the frame memory 18A and the frame memory 18B, respectively, while the transformation of data arrangement is executed between successive two frames in the manner described.

In the described embodiment, the interleave circuit 12 conducts an interleave process in each frame, while changing the interleave rule for successive frames, and the interleave circuit 16 conducts an interleave process in a plurality of frames. Therefore, the non-linearity of the interpolated reproduced image caused by the difference in time is reduced during reproduction in a special reproduction mode, so that the deterioration of the quality of the reproduced image is remarkably reduced. In addition, there is no portion of the recorded data which cannot be reproduced at all at a given reproduction speed.

As will be understood from the foregoing description, according to the present invention, it is possible to reproduce a recorded image with extremely small deterioration of the image quality, even when the reproduction is conducted in a mode which has a low probability of reproduction of the correct data. In addition, presence of any portion of the recorded data which cannot be reproduced at all is completely avoided.

What is claimed is:

1. A video processing device, comprising:
    (a) transposing means for transposing input digital video data of successive pictures between first and second pictures which are successive in a unit of a data block composed of the data of a plurality of pixels which are two-dimensionally arranged in the picture;
    (b) processing means for processing transposed video data output from said transposing means in a unit of a data group composed of a plurality of the data blocks which are equally dispersed in the picture; and
    (c) recording means for recording processed video data output from said processing means on parallel tracks formed on a recording medium, a substantial half of the video data recorded on each track being the video data of the first picture and another substantial half of the video data recorded on each track being the video data of the second picture.

2. A device according to claim 1, wherein said processing means includes means for adding codes for error correction.

3. A device according to claim 2, wherein said processing means includes means for adding coded for data synchronization.

4. A device according to claim 1, wherein the video data are recorded on each of the tracks in an order corresponding to an order in a predetermined direction in the picture.

5. A video processing method, comprising steps of:
    (a) transposing input digital video data of successive pictures between first and second pictures which are successive in a unit of a data block composed of the data of a plurality of pixels which are two-dimensionally arranged in the picture;

(b) processing transposed video data formed by said transposing step in a unit of a data group composed of a plurality of the data blocks which are equally dispersed in the picture; and (c) recording processed video data formed by said processing step on parallel tracks formed on a recording medium, a substantial half of the video data recorded on each track being the video data of the first picture and another substantial half of the video data recorded on each track being the video data of the second picture.

6. A video processing device, comprising:

(a) transposing means for transposing input digital video data of successive pictures between first and second pictures which are successive in a unit of a data block composed of the data of a plurality of pixels which are two-dimensionally arranged in the picture;

(b) processing means for processing transposed video data output from said transposing means; and (c) recording means for recording processed video data output from said processing means on parallel tracks formed on a recording medium, the video data of the first and second pictures are recorded on each track in an order corresponding to an order in a predetermined direction in the picture.

7. A device according to claim 6, wherein the predetermined direction is a vertical direction on the picture.

8. A video processing method, comprising steps of (a) transposing input digital video data of successive pictures between first and second pictures which are successive in a unit of a data block composed of the data of a plurality of pixels which are two-dimensionally arranged in the picture;

(b) processing transposed video data formed by said transposing step; and (c) recording processed video data formed by said processing step on parallel tracks formed on a recording medium, the video data of the first and second pictures are recorded on each track in an order corresponding to an order in a predetermined direction in the picture.

9. A method according to claim 8, wherein the predetermined direction is a vertical direction on the picture.

* * * * *